(12) United States Patent  
Meyerboeck et al.

(10) Patent No.: US 7,722,018 B2
(45) Date of Patent: May 25, 2010

(54) REAR AND/OR FRONT AXLE SUBFRAME BEARING AND METHOD OF ASSEMBLING A REAR AND/OR FRONT AXLE SUBFRAME BEARING

(75) Inventors: Wilhelm Meyerboeck, Badneuenahr (DE); Barry Graul, Clarkston, MI (US); Val Moreno, Bloomfield Hills, MI (US)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 913 days.

(21) Appl. No.: 11/456,664

(22) Filed: Jul. 11, 2006

(65) Prior Publication Data

US 2008/0029943 A1  Feb. 7, 2008

(51) Int. Cl.
B60G 11/22 (2006.01)

(52) U.S. Cl. .......... 267/293; 267/141.2; 267/141.3; 267/141.4; 267/140.12; 248/635; 384/296

(58) Field of Classification Search .......... 267/293, 267/141.2, 141.3, 141.4, 141.7, 140.12, 219, 267/281; 384/222, 275, 296, 299, 397; 280/124.109, 280/124.128, 785; 180/299, 300; 248/634, 248/635; 296/35.1
See application file for complete search history.

(56) References Cited

U.S. PATENT DOCUMENTS

| 3,107,953 | A | * | 10/1963 | Palm .................... 384/153 |
| 3,604,771 | A | * | 9/1971 | Luzsicza ................ 384/125 |
| 4,531,761 | A | | 7/1985 | von Sivers |
| 4,667,943 | A | * | 5/1987 | Izumi et al. ........... 267/141.3 |
| 4,744,677 | A | * | 5/1988 | Tanaka et al. .......... 384/222 |
| 4,809,960 | A | * | 3/1989 | Kakimoto et al. ........ 267/141 |
| 5,062,654 | A | * | 11/1991 | Kakimoto et al. ..... 280/124.136 |
| 5,103,529 | A | | 4/1992 | Koenig |
| 5,127,698 | A | | 7/1992 | Koenig |
| 5,261,748 | A | * | 11/1993 | Kameda ................ 384/222 |
| 5,593,233 | A | * | 1/1997 | Kammel et al. ......... 384/222 |
| 5,941,511 | A | * | 8/1999 | Dawda et al. .......... 267/140.12 |

(Continued)

FOREIGN PATENT DOCUMENTS

DE  3217959 C2  11/1983

(Continued)

Primary Examiner—Robert A Siconolfi
Assistant Examiner—Mariano Sy
(74) Attorney, Agent, or Firm—McGlew and Tuttle, P.C.

(57) ABSTRACT

A subframe bearing and method of forming same is provided with a subframe (12) having a main section between a first engagement flange (30) and a second engagement flange (32), an inner tube (2), an outer tube (4) and an elastomer bushing (6), as well as a stop plate (16). The elastomer bushing is vulcanized with the inner tube (2) and the outer tube (4) defining a bushing subassembly. The outer tube has a main section (42), an angled transition portion (44) and a step portion (40). The outer tube continues axially from the main section (42) to a stop flange (20). The elastomer bushing (6) has a bulged outer surface portion (36) extending continuously and uninterrupted outwardly of the angled transition portion (44) and extending continuously and uninterrupted outwardly of the step portion (40). The bulge of the bulged outer surface portion is radially outwardly of the subframe main section (12) to form an engaging stop surface in contact with the second radially extending engagement flange (32) and a surface in contact with the stop plate (16).

5 Claims, 1 Drawing Sheet

U.S. PATENT DOCUMENTS

| | | | |
|---|---|---|---|
| 6,170,812 B1 * | 1/2001 | Nicoles | 267/281 |
| 6,666,438 B2 * | 12/2003 | Nakagawa | 267/141.2 |
| 7,367,551 B2 * | 5/2008 | Kumper | 267/281 |
| 7,429,053 B2 * | 9/2008 | Katagiri et al. | 280/124.109 |

FOREIGN PATENT DOCUMENTS

| | | |
|---|---|---|
| DE | 4011827 C2 | 2/1992 |
| DE | 4011854 C2 | 2/1992 |
| DE | 4302238 C1 | 4/1994 |
| DE | 19910308 B4 | 9/2000 |

* cited by examiner

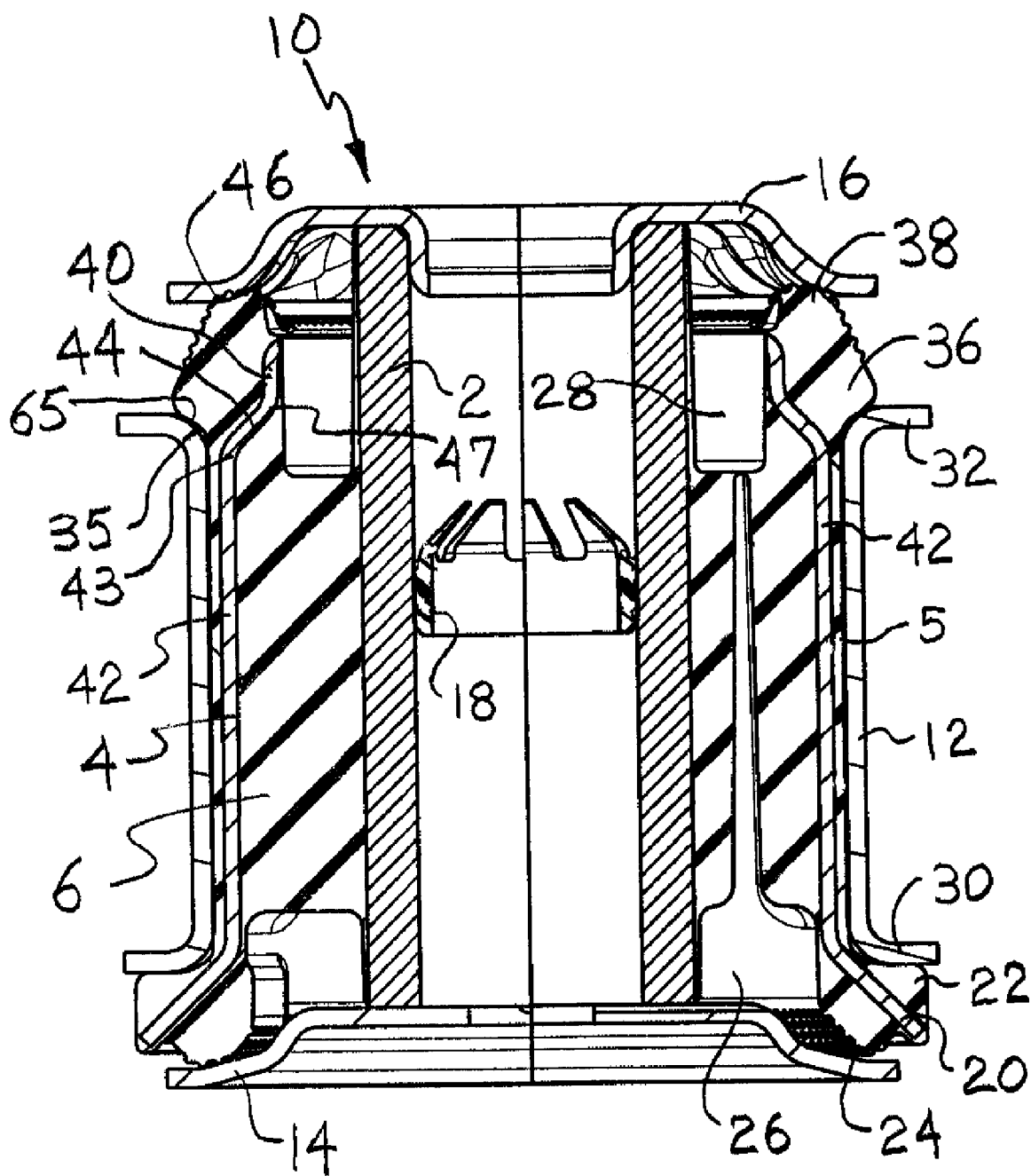

REAR AND/OR FRONT AXLE SUBFRAME BEARING AND METHOD OF ASSEMBLING A REAR AND/OR FRONT AXLE SUBFRAME BEARING

FIELD OF THE INVENTION

The present invention relates to a support bearing for an elastic connection of vehicle parts and more particularly to a rear and/or front axle subframe for passenger vehicles.

BACKGROUND OF THE INVENTION

U.S. Pat. No. 4,531,761 (corresponding to DE 32 17 959) discloses a subframe bearing with a bushing subassembly that is held to a subframe (support member) at one end by a flange in the outer metal tube. The outer tube is vulcanized in the elastomer. At the other end the subassembly is held to the subframe only by the elastomer itself in the form of a tension pad or bumper-resilient limit flange. The bearing is mounted in a vehicle part by pressing the rubber bush with a tight fit into the subframe. The rubber tension pad or bumper lower resilient limit flange, facing away from the flange of the outer tube, is correspondingly compressed in a radial direction. When the rubber bush reaches its final installation position, the rubber tension pad comes out of the subframe, expands in a radial direction, engages over the edge of the subframe and forms an axial stop and a buffer for a stop plate. The stop plate is arranged on the clamping screw passing through the bushing subassembly and screwed to the other vehicle part to limit the axial travel of the support bearing in one direction.

The rubber bush is exposed to especially high stresses in the axial direction. Although mounted in the subframe with a high radial prestress, the bush subassembly may shift axially. The stop formed by the rubber tension pad engaging behind the edge of the subframe may be overcome, and the bush subassembly may be drawn into the subframe.

U.S. Pat. No. 5,127,698 (corresponding to DE 40 11 827) discloses a support bearing that prevents shifting of the rubber bush subassembly in the subframe even under the influence of relatively high vibrations. A bush endpiece, facing away from the end flange of the outer tube, is provided with supporting elements which, after radial expansion, engage snap-like behind the edge of the subframe or receiving lug. This presents a metal backed radially extending flange. At an axial distance from the edge of the subframe the supporting elements are adjacent to an abutment provided in the bush endpiece. The structure requires vulcanizing in both the outer tube with end flange as well as a plurality of supporting elements. This presents complications and adds cost to the manufacturing of such a support bearing.

U.S. Pat. No. 5,103,529 (corresponding to DE 40 11 854) discloses a support bearing with a bushing subassembly that is held to a subframe (support member) at one end by a flange in the outer metal tube which is vulcanized in the elastomer. At the other end the subassembly is held to the subframe by an elastomer tension pad (bulge or bead). After the bushing subassembly has been introduced into the subframe, a spring ring is inserted such that the rubber bush can no longer shift in the subframe at that side. The spring ring, in an inwardly spread state, has a diameter larger than the inside diameter of the subframe. The structure requires additional actions during manufacturing and adds cost and complexity.

Support bearings have also been proposed in which the steel outer tube vulcanized in the elastomer bushing has flanges at both ends. This presents manufacturing costs and difficulties as the bushing subassembly is inserted into a subframe and subsequently a further step is required involving pressing the two flanges toward each other. This proves to be expensive. However, these flanges that form stops for maintaining the position of the bushing subassembly guarantee the minimum pressing out force of 35 kN.

The previous solutions have also involved higher costs based on the provision of a two-component rubber bearing. The higher costs associated with a double vulcanization process is a drawback. Additionally, structures include a greater number of metal parts in the final rubber bearing than is desirable.

SUMMARY OF THE INVENTION

It is an object of the invention to provide a passenger car rear and/or front axle subframe bearing with a bushing subassembly made of rubber or other elastomer and which guarantees a minimum pressing force of 35 kN or higher and which can be manufactured cost-effectively.

According to the invention, a subframe bearing is provided comprising a subframe having an axially extending main section between a first radially extending engagement flange and a second radially extending engagement flange, an inner tube, an outer tube and an elastomer bushing, as well as a stop plate. The elastomer bushing is formed with the inner tube and the outer tube vulcanized thereto defining a bushing subassembly, with the elastomer bushing vulcanized around an outer surface of the inner tube. The outer tube has a main section substantially parallel to and coaxial with the inner tube, an angled transition portion extending, from the main section, toward the inner tube, and a step portion extending, from the angled transition portion, substantially parallel to the inner tube and coaxially with the inner tube at a location radially inwardly of the outer tube main section. The inner tube continues axially from another side of the main section to a stop flange extending radially outwardly with respect to the outer tube main section. The elastomer bushing has a first stop portion supported by the stop flange. The stop portion has a radially extending stop surface engaging an outer surface of the first radially extending engagement flange. The elastomer bushing has a main outer surface extending parallel to and outwardly of the outer tube main section and has a bulged outer surface extending continuously and uninterrupted outwardly of the angled transition portion and extending continuously and uninterrupted outwardly of the step portion. The bulged outer surface bulges radially outwardly of the subframe main section to form an engaging stop surface in contact with the second radially extending engagement flange.

The elastomer bushing may have an insertion end axially spaced from a main bulge of the bulged outer surface in a direction away from the second radially extending engagement flange. The elastomer bushing is tapered with an outer surface extending radially inwardly from the main bulge of the bulged outer surface to the insertion end.

The stop plate is advantageously in contact with the insertion end of the elastomer bushing whereby the bulged outer surface is trapped between the stop plate and the second radially extending engagement flange.

The elastomer bushing has an outer surface in a region of the insertion end. This extends axially toward the bulged outer surface and may have grooves.

An end plate may be provided, wherein the elastomer bushing has a contact end axially spaced from the stop flange, the contact end being positioned for contact with the end plate.

The elastomer bushing may have an outer surface in a region of the contact, extending axially toward stop flange. This may be textured or provided with grooves.

According to another aspect of the invention, the elastomer bushing interacts with the stop plate, the step portion of the outer tube and the second radially extending engagement flange of the subframe. The elastomer bushing bulged extends continuously and uninterrupted outwardly of the step portion with the bulged outer surface bulging radially outwardly of the subframe main section and in contact with the second radially extending engagement flange and the stop plate. This provides an uninterrupted elastomer engaging stop portion between the step portion, the second radially extending engagement flange and the stop plate. The radially inward position of the angled transition portion and the step portion allow for ease in assembly. In the assembled state, with the elastomer engaging stop portion supported by the step portion, compressive forces act between the extending engagement flange and the stop plate to trap the bulging uninterrupted elastomer engaging stop portion and to fix the subassembly axially relative to the subframe.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a cross-sectional view of the passenger car rear and/or front axle subframe bearing according to the invention with a right side section having a different sectional plane from a left side.

DESCRIPTION OF THE PREFERRED EMBODIMENT

Referring to the drawings in particular, the passenger car rear and/or front axle subframe bearing according to the invention is generally designated 10. The subframe bearing 10 comprises a metal inner tube 2 with an outer surface vulcanized to an elastomer (e.g., rubber) bushing 6. An outer tube 4 is vulcanized into the bushing 6 such that the outer tube 4 is coated at a main or central region 42 by a rubber layer 5 of the bushing 6. The inner tube 2, the outer tube 4 and the elastomer bushing 6 form a bushing subassembly. The sheet metal (steel, aluminum, alloy, etc.) tube 4 may also be vulcanized to form the outer circumference of the bushing subassembly (or bushing core) and the central region rubber layer 5 may be made thin or of a thickness as desired.

The bushing subassembly in a mounted state is in a subframe 12 to form the bearing 10 with the central region rubber layer 5 of the bushing 6 in contact with an inner surface of a main or central region of the subframe 12. An end plate/washer 14 and a stop plate/washer 16 complete the assembly. A plastic or metal retaining feature 18 may be provided for holding a screw bolt (not shown for clarity). The screw bolt connects the axle subframe bearing 10 to the vehicle.

The outer tube 4 is annular and is formed of sheet metal with the main or central region 42 extending parallel to the inner tube 2. The outer tube 4 has an integral metal stop flange 20 extending radially outwardly and axially with respect to the outer tube main section 42. In the region of the stop flange 20 the elastomer bushing 6 has an elastomer stop portion 22.

The elastomer stop portion 22 has a radially extending stop surface that engages an outer radial surface of a subframe engagement flange 30. This prevents further insertion direction axial movement of the subassembly with respect to the subframe 12. At a side of the elastomer bushing 6, facing the end plate 14, the elastomer bushing 6 has grooves or a textured surface 24 to facilitate contact interaction with the end plate 14. In the region of the stop flange 20 and elastomer stop portion 22, the elastomer bushing 6 has a cavity 26. The cavity 26 is formed by a surface of the elastomer bushing 6 including the inside of the stop portion 22 and a layer of elastomer covering the inner tube 2. In some regions, this cavity may extend parallel to the main or central region of the outer tube 4, with the dimension of the cavity being used to set the attributes of the overall axle subframe bearing 10.

At the opposite end of the bushing subassembly, or insertion end, the elastomer bushing 6 has an insertion end elastomer stop portion (or elastomer flange) 36. This is a bulged portion having a radial dimension (outer diameter) quite a bit greater than the radial dimension of the main or central region of the bushing 6 (i.e., larger than the diameter of region of the rubber layer 5). The stop portion 36 has a curved surface that is radially extending for engaging the curved radially extending subframe engagement flange 32 and engaging the stop plate/washer 16. This arrangement is to prevent axial movement of the subassembly relative to the subframe 12. The insertion end 38 of the bushing 6 has grooves 46 for contact with the stop plate/washer 16. Upon assembly with the screw bolt, the compressive forces acting on the stop portion 36, applied by the stop plate/washer 16 and the subframe engagement flange 32 trap the stop portion 36. The compressive action contributes to the bulging of the stop portion 36 so as to maintain stop portion 36 between the stop plate/washer 16 and the subframe engagement flange 32.

The outer tube 4 has a step portion 40 extending substantially parallel to the inner tube 2 and the central section 42 of the outer tube 4. The step portion 40 is annular, extending as an integral continuation of the outer tube 4, coaxial with the inner tube 2. A transition portion 44 is provided between the step portion 40 and the central section 42. The transition portion 44 is angled. In the mounted state, the curve of initial bend 43 between the central section 42 and the transition portion 44, that sets the relative angle of the transition portion 44, is opposite to and at about the same axial position as the curve of the bend 35 of the subframe engagement flange 32. This axial position also coincides with the curve 65 that starts the radial widening of the bushing 6 to form the stop portion 36. In the mounted state, the next bend 47 of the outer tube 4, between the step portion 40 and the transition portion 44, that sets the relative angle of the transition portion 44, is opposite a widest part of the bulge of the elastomer stop portion 36. The elastomer bushing 6 extends radially outwardly and continuously and uninterrupted from the step portion 40 and the transition portion 44 to an outer peripheral surface of the elastomer stop portion 36 continuing tapering radially inwardly to an insertion end 38. The elastomer stop portion 36 outer surface, in the mounted state, is in contact along a portion of the bend 35 of subframe engagement flange 32. The elastomer stop portion 36 separates from contact with engagement flange adjacent to the widest part of the bulge of the elastomer stop portion 36 and then tapers radially inwardly to the tip end or the insertion end 38 at an angle that is steeper as compared to the steepness of the angle of the transition part 44. The angle of the tapered outer surface may be about the same as the angle of a line from the bend 43 to the insertion end of the outer tube 4. The insertion end 38 of the elastomer 6 may have grooves or a textured surface in the contact region with the stop plate 16.

In a mounted state, the structure and geometry of the outer tube 4, the stop portion 36 in cooperation with the subframe engagement flange 32 is particularly advantageous in guaranteeing a minimum pressing-out force of 35 kN to avoid axial displacement of the bushing subassembly relative to the subframe 12.

In the region of the step portion 40 the elastomer bushing 6 has a cavity 28 formed by a surface including the surface of the elastomer covering the step portion 40 and a layer of the elastomer bushing 6 covering the inner tube 2. The dimension of the cavity can affect the attributes of the overall axle subframe bearing 10.

Most advantageously, the construction allows the bushing subassembly to be inserted in the subframe 12 in a simple and economical manner, while still guaranteeing a minimum pressing-out force of 35 kN or higher of the bushing 10 with the compression provided via the washer 16. The diameter of the sheet metal outer tube 4 and elastomer layer 5 presents an outer dimension that is sized relative to the inside diameter of the subframe 12 so that the rubber bushing 6 with its outer rubber layer 5 is press fit in the orifice of the subframe 12. The structure and geometry of the outer tube 4, the stop portion 36 and tapered end 38 allows insertion of the bushing subassembly from the direction from subframe engagement flange 30 toward subframe engagement flange 32 with the position of the first bend 43 of the transition portion 44 and the position of the second bend 47 at the stop portion 40 allowing the bulge of step portion 36 to deform enough to pass the central portion of the subframe 12. This geometry also allows the construction to attain a minimum pressing-out force of 35 kN or higher.

While specific embodiments of the invention have been shown and described in detail to illustrate the application of the principles of the invention, it will be understood that the invention may be embodied otherwise without departing from such principles.

APPENDIX

List of Reference Numerals

2 Metal inner tube
4 metal outer tube
5 outer rubber layer
6 elastomer bushing
10 subframe bearing
12 subframe
14 end plate/washer
16 stop plate/washer
18 plastic retention feature
20 stop flange
22 elastomer stop portion
24 grooved/textured engagement surface
26 stop end elastomer cavity
28 insertion end elastomer cavity
30 subframe engagement flange
32 subframe engagement flange
35 bend of subframe
36 insertion end elastomer stop portion (elastomer flange)
38 tapered elastomer insertion end
40 stepped outer part (reduced diameter)
42 main section outer part (main diameter)
43 first bend of the transition portion
44 transition portion
46 grooved/textured elastomer insertion end
47 second bend of the transition portion
65 curve of elastomer bushing

What is claimed is:

1. A subframe bearing comprising:
a subframe having an axially extending main section between a first radially extending engagement flange and a second radially extending engagement flange;
an inner tube;
an outer tube;
an elastomer bushing, said elastomer bushing being formed with said inner tube and outer tube vulcanized thereto defining a bushing subassembly with said elastomer bushing vulcanized around an outer surface of said inner tube, said outer tube having a main section substantially parallel to and coaxial with said inner tube, an angled transition portion extending, from said main section, toward said inner tube, and a step portion extending, from said angled transition portion, substantially parallel to said inner tube and coaxially with said inner tube at a location radially inwardly of said outer tube main section, said outer tube continuing axially from another side of said main section to a stop flange extending radially outwardly with respect to said outer tube main section, said elastomer bushing having a first stop portion supported by said stop flange, said stop portion having a radially extending stop surface engaging an outer surface of said first radially extending engagement flange, said elastomer bushing having a main outer surface extending parallel to and outwardly of said outer tube main section and said elastomer bushing having a bulged outer surface portion extending continuously and uninterrupted outwardly of said angled transition portion and extending continuously and uninterrupted outwardly of said step portion with said bulged outer surface portion bulging radially outwardly of said subframe main section to form an engaging stop surface in contact with said second radially extending engagement flange; and
a stop plate, wherein said elastomer bushing has an insertion end axially of said bulged outer surface portion, said stop plate being in contact with said insertion end of said elastomer bushing whereby said bulged outer surface portion is trapped between said stop plate and said second radially extending engagement flange, said elastomer bushing having an outer surface in a region of said insertion end with a texture or with grooves.

2. A subframe bearing according to claim 1, wherein said elastomer bushing has an insertion end of said bulged outer surface portion in a direction away from said second radially extending engagement flange, said elastomer bushing being tapered with an outer surface extending radially inwardly to said insertion end.

3. A subframe bearing according to claim 1, further comprising:
an end plate, wherein said elastomer bushing has a contact end axially spaced from said stop flange, said contact end being positioned for contact with said end plate.

4. A subframe bearing according to claim 3, wherein said elastomer bushing has an outer surface in a region of said contact end and extending axially toward stop flange with grooves.

5. A subframe bearing comprising:
a subframe having an axially extending main section between a first radially extending engagement flange and a second radially extending engagement flange;
an inner tube;
an outer tube;

an elastomer bushing, said elastomer bushing being formed with said inner tube and outer tube vulcanized thereto defining a bushing subassembly with said elastomer bushing vulcanized around an outer surface of said inner tube, said outer tube having a main section substantially parallel to and coaxial with said inner tube, an angled transition portion extending, from said main section, toward said inner tube, and a step portion extending, from said angled transition portion, substantially parallel to said inner tube and coaxially with said inner tube at a location radially inwardly of said outer tube main section, said outer tube continuing axially from another side of said main section to a stop flange extending radially outwardly with respect to said outer tube main section, said elastomer bushing having a first stop portion supported by said stop flange, said stop portion having a radially extending stop surface engaging an outer surface of said first radially extending engagement flange, said elastomer bushing having a main outer surface extending parallel to and outwardly of said outer tube main section and said elastomer bushing having a bulged outer surface portion extending continuously and uninterrupted outwardly of said angled transition portion and extending continuously and uninterrupted outwardly of said step portion with said bulged outer surface portion bulging radially outwardly of said subframe main section to form an engaging stop surface in contact with said second radially extending engagement flange; and an end plate, wherein said elastomer bushing has a contact end axially spaced from said stop flange, said contact end being positioned for contact with said end plate, wherein said elastomer bushing has an outer surface in a region of said contact end and extending axially toward stop flange with grooves.

* * * * *